Sept. 10, 1935.  N. P. LARSEN  2,014,140

VEHICLE ROOF

Original Filed April 12, 1933  2 Sheets-Sheet 1

Inventor
Neil P. Larsen
By Bates Golrick + Teare
Attorneys

Sept. 10, 1935.　　　　N. P. LARSEN　　　　2,014,140

VEHICLE ROOF

Original Filed April 12, 1933　　2 Sheets-Sheet 2

Inventor

Neil P. Larsen

By Bates Golrick + Teare

Attorneys

UNITED STATES PATENT OFFICE 2,014,140

VEHICLE ROOF

Neil P. Larsen, Cleveland Heights, Ohio, assignor to The American Coach and Body Company, Cleveland, Ohio, a corporation of Ohio Original application April 12, 1933, Serial No. 665,769. Divided and this application June 30, 1933, Serial No. 678,455

5 Claims. (Cl. 296—137)

My invention relates to motor vehicle bodies, particularly to those, which are used by public utility companies, and is a division of my copending application, Serial No. 665,769 filed April 12, 1933 relating to Motor vehicle body construction, Patent No. 1,944,439 issued January 23, 1934. Such organizations require the use of a derrick that is mounted on a truck, and that projects a considerable distance above the roof. It is desirable to extend the derrick rearwardly so as to utilize the weight of the engine, as a counterweight, but such arrangement was considered impractical, as it necessitated holes in the roof for one of the supporting legs and the hoisting cable. Consequently, the practice has been to mount the derrick on the forward end of the truck. This arrangement however, is objectionable for the weight of the motor is not spaced sufficiently far from the points of connection between the forward legs of the derrick and the truck frame to lift the desired loads at a predetermined radius.

A further consideration in connection with the design of truck bodies for this class of work is the fact that the long articles, such as derrick legs, pike poles and ladders may be carried without seriously interfering with mean of access to the driver's seat, and without protruding laterally beyond the rails of the truck body.

The present invention therefore, is directed toward a construction of a truck body, which permits the derrick to be erected adjacent the rearward end of the truck, and which permits long articles to be carried in a safe and convenient manner.

Figure 1:
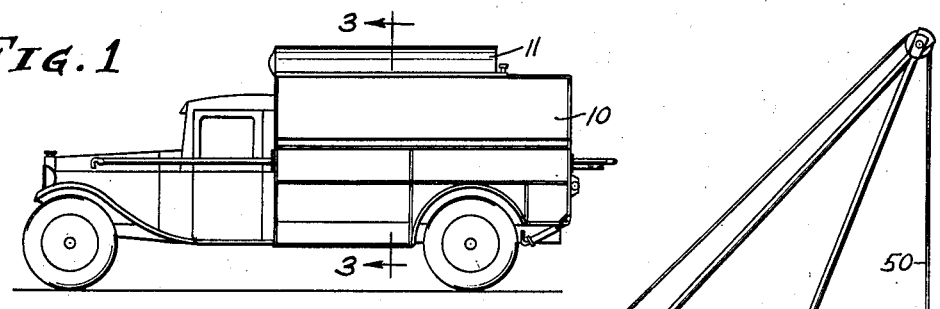
Figure 2:
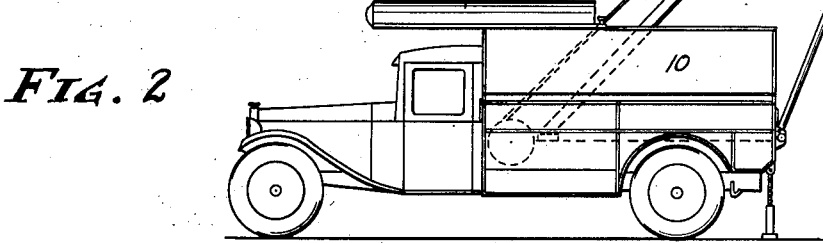
Figure 3:
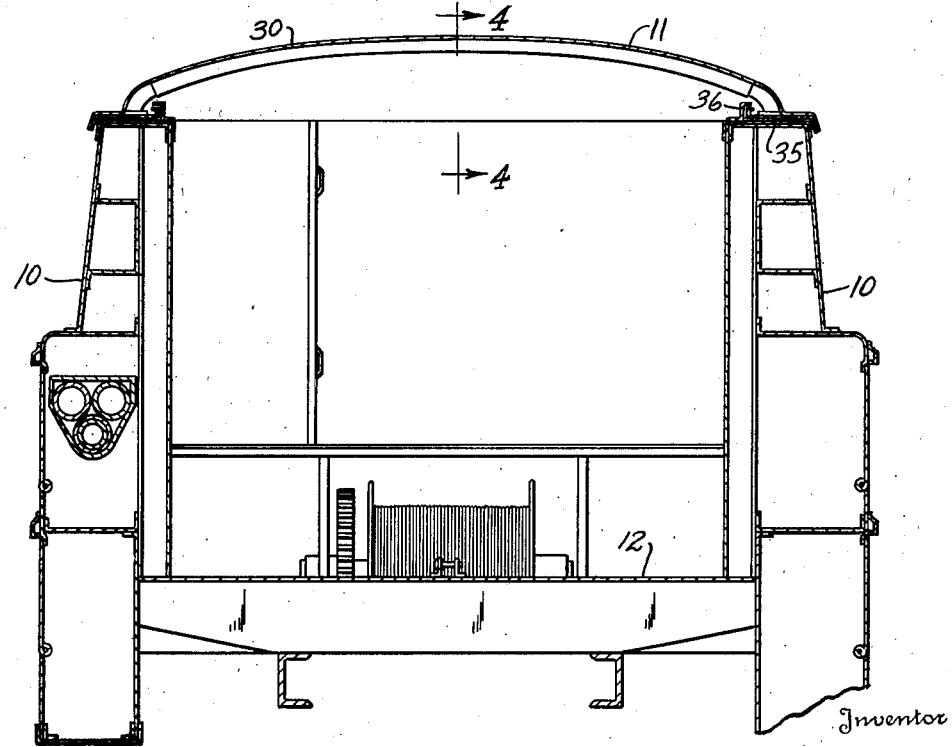
Figure 4:
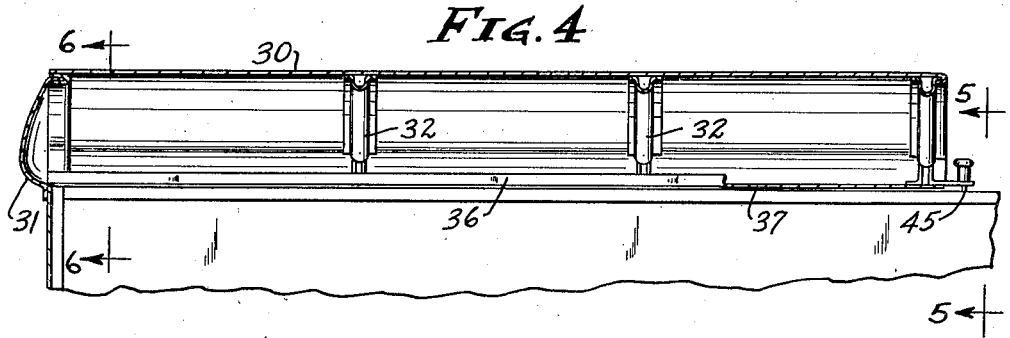
Figures 5, 6:
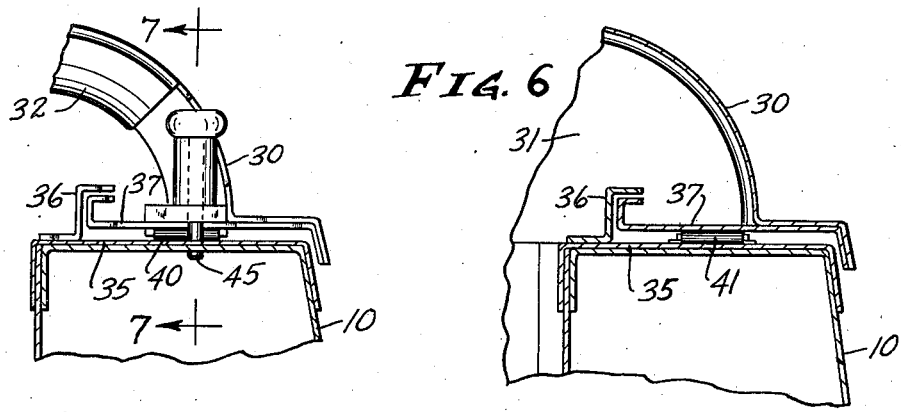
Figure 7:
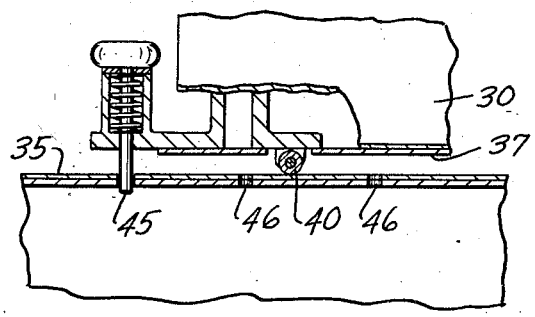

Referring now to the drawings, Fig. 1 is a side elevation of a truck body having my invention; Fig. 2 is a similar elevation showing the roof moved forwardly and illustrating a derrick in the erected position; Fig. 3 is a section taken on an enlarged scale on the line 3—3 in Fig. 1, and Fig. 4 is a section taken on the line 4—4 in Fig. 3; Fig. 5 is an enlarged sectional view taken on the line 5—5 in Fig. 4; Fig. 6 is a sectional view taken on the line 6—6 in Fig. 4, and Fig. 7 is a section taken on the line 7—7 in Fig. 5.

Field work of public utility companies necesitates the use of equipment for handling telephone poles, heavy transformers and other articles of similar nature. Such equipment includes pike poles and derrick and suitable compartments for tools and equipment, while allowing sufficient space within the truck for men to work.

The present invention provides a truck body in which the long articles may be conveniently carried and in which the derrick may be erected at the rearward end of the truck without necessitating the use of holes in the roof. To this end, the motor vehicle has a body wherein the sides are designated 10, a roof 11 and a floor 12.

To permit the derrick to be erected at the rearward end of the truck without requiring holes to be cut in the roof, I provide a roof which is movably mounted on a trackway that is formed at the top of the two side members. The roof, as shown, comprises an arched metallic plate 30 that is open at the rearward end and is preferably closed by a plate 31 at the forward end. It is preferably reinforced by transversely extending ribs 32 which may be hollow rolled members of substantially U-shaped cross section, and which may be fastened to the underside of the roof plate by a welding operation.

The trackway may be formed by horizontal plates 35, which cover the hollow sides, and by Z-bars 36 which are fastened on the plates and which extend lengthwise of the body. The roof then has a laterally extending portion in the form of plates 37 which extend inwardly and beneath the outwardly extending part of the Z-bars. Rollers 40 may be journalled in the roof adjacent the rearward end thereof for engagement with the plate 35, while other rollers 41 may be journalled in the bearings, that are carried by the trackway plates 35, adjacent the forward end of the body.

To hold the roof in any desired position, I have shown a spring pressed plunger 45, which is carried by the roof and which is adapted to extend through openings 46 in the trackway. This locking feature is advantageous in that it enables the roof to be held at any desired position. Thus, for example, the roof may be moved forwardly only a relatively short distance, and as a result, a current of air will be forced under the roof and will provide adequate ventilation within the body while the truck is in motion. Furthermore, the roof when moved to the extreme limit of forward movement, as is shown in Fig. 2, will provide adequate space for the erection of the derrick and the operation of the hoist cable 50.

While I have shown and described my invention, as being particularly adapted for use in connection with motor vehicle bodies, it is to be understood that it is not to be restricted to such use, but that the form shown is merely illustrative of the invention.

I claim:—

1. In a vehicle roof, a rigid arched shell, a portion of the shell flaring outwardly in a lateral direction, a down-turned flange on the edge of said lateral portion, a bearing plate secured to the underside of the lateral portion, and extending inwardly from the roof shell, and an upturned portion on the inner edge of the plate to form a guide for the roof.

2. In a truck having a driver's compartment and a body including side walls and relatively wide trackway surfaces surmounting the same, a transversely arched roof member for the body having its longitudinally extending marginal portions overhanging the side walls and having bearing surfaces projecting inwardly on the underside thereof for operatively engaging the respective trackway surfaces to support the roof, means cooperating with the edges of the bearing surfaces to laterally guide the roof on the trackway surfaces, and means for holding the roof in horizontally disposed position during its entire travel on the trackway surfaces.

3. In a vehicle body, the combination of substantially flat trackways on the upper portions of the body, guide members secured to the inner sides of the trackways and having overhanging flanges, bearing plates each having a flanged portion on one edge lying beneath the flange of the respective guide member and extending laterally over the trackway, down-turned flanges on the outer edges of the plates coacting with the side surfaces of the body and an arched roof spanning the trackways and having laterally extending portions substantially following the contour of the bearing plates and flanges and secured to the plates.

4. A vehicle body having hollow sides, the upper portions of the sides forming trackways, a roof slidably mounted on the trackways, the roof comprising a rigid arch member spanning the body and having marginal portions which lie parallel to the trackways and terminate in flanges extending downwardly adjacent the sides of the body, bearing plates lying adjacent the flanges and secured to marginal portions of the roof on its under side, the plates being of substantially the same width as the respective trackways and each having an upturned portion on its inner edge to form a guide, and means on the inner sides of the trackways to coact with the guides.

5. In a motor vehicle having a body, including side walls and a driver's cab disposed forwardly thereof, said cab having a fixed roof and lateral vision openings, the side walls of the body terminating near the level of the cab roof trackway surfaces on the side walls in a plane above the upper limits of the cab openings, a rigid arched shiftable roof having a closed upper wall and rigid skirt portions depending therefrom and outwardly overhanging the upper portions of respective side walls to make rain-proof joints therewith, said body roof having all portions thereof terminating adjacent the trackway and the entire trackway being disposed adjacent the level of the cab roof guiding means for the roof between the side walls and the roof including a support for the roof arranged to hold the roof substantially parallel to the trackway surfaces when in a position forwardly overhanging the same a material distance in superposed relation to the cab roof, the lower limits of said skirt portions being disposed above the upper limits of said lateral vision openings when the roof is in said overhanging position, so as not to obstruct the vision laterally of the operator in the cab.

NEIL P. LARSEN.